(12) United States Patent
Vivanco et al.

(10) Patent No.: US 9,306,771 B1
(45) Date of Patent: Apr. 5, 2016

(54) SYSTEMS AND METHODS OF MANAGING NETWORK COMMUNICATION

(71) Applicant: Sprint Spectrum LP, Overland Park, KS (US)

(72) Inventors: Daniel Vivanco, Sterling, VA (US); Yu Zhou, Herndon, VA (US); Chunmei Liu, Great Falls, VA (US); Kyounghwan Lee, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 567 days.

(21) Appl. No.: 13/679,886

(22) Filed: Nov. 16, 2012

(51) Int. Cl.
*H04L 12/54* (2013.01)
*H04L 12/801* (2013.01)

(52) U.S. Cl.
CPC .............. *H04L 12/569* (2013.01); *H04L 47/10* (2013.01)

(58) Field of Classification Search
None
See application file for complete search history.

(56) References Cited

U.S. PATENT DOCUMENTS

| 7,788,386 | B2 | 8/2010 | Svensson |
| 2009/0041039 | A1* | 2/2009 | Bear ....................... H04L 45/38 370/401 |
| 2009/0180396 | A1* | 7/2009 | Kish ............................. 370/254 |
| 2010/0323735 | A1* | 12/2010 | Dinan et al. ................... 455/509 |
| 2011/0080886 | A1 | 4/2011 | Chandrachood et al. |
| 2012/0124633 | A1* | 5/2012 | Lu et al. ........................ 725/114 |
| 2013/0208589 | A1* | 8/2013 | Lopez Toledo et al. ...... 370/230 |
| 2015/0296451 | A1* | 10/2015 | Friman ............... H04W 52/267 455/422.1 |

* cited by examiner

*Primary Examiner* — Alex Skripnikov
*Assistant Examiner* — Raza Ansari

(57) ABSTRACT

A first throughput is determined of a first data flow at a gateway from a first access node and a second throughput is determined of second data flow at an inspection node from the gateway. A third throughput is determined comprising one or more third data flows from the gateway to a second access node based on a difference between the first throughput and the second throughput. At least one of the third data flows of the third throughput is identified, and when the third throughput meets a throughput threshold the identified third data flow is adjusted.

13 Claims, 5 Drawing Sheets

SYSTEMS AND METHODS OF MANAGING NETWORK COMMUNICATION

TECHNICAL BACKGROUND

Communication network operators employ traffic management techniques to prevent network overload. Operators monitor traffic into and out of a communication network as well as purely within the communication network. Applications which consume large amounts of network resources are of particular concern to network operators, which therefore desire to detect and monitor such network behavior, and where necessary to adjust the usage of network resources by such applications.

OVERVIEW

In an embodiment, a first throughput is determined of a first data flow at a gateway from a first access node and a second throughput is determined of second data flow at an inspection node from the gateway. A third throughput is determined comprising one or more third data flows from the gateway to a second access node based on a difference between the first throughput and the second throughput. One of the third data flows of the third throughput is identified, and when the third throughput meets a throughput threshold the identified third data flow is adjusted.

DETAILED DESCRIPTION

Figure 1:
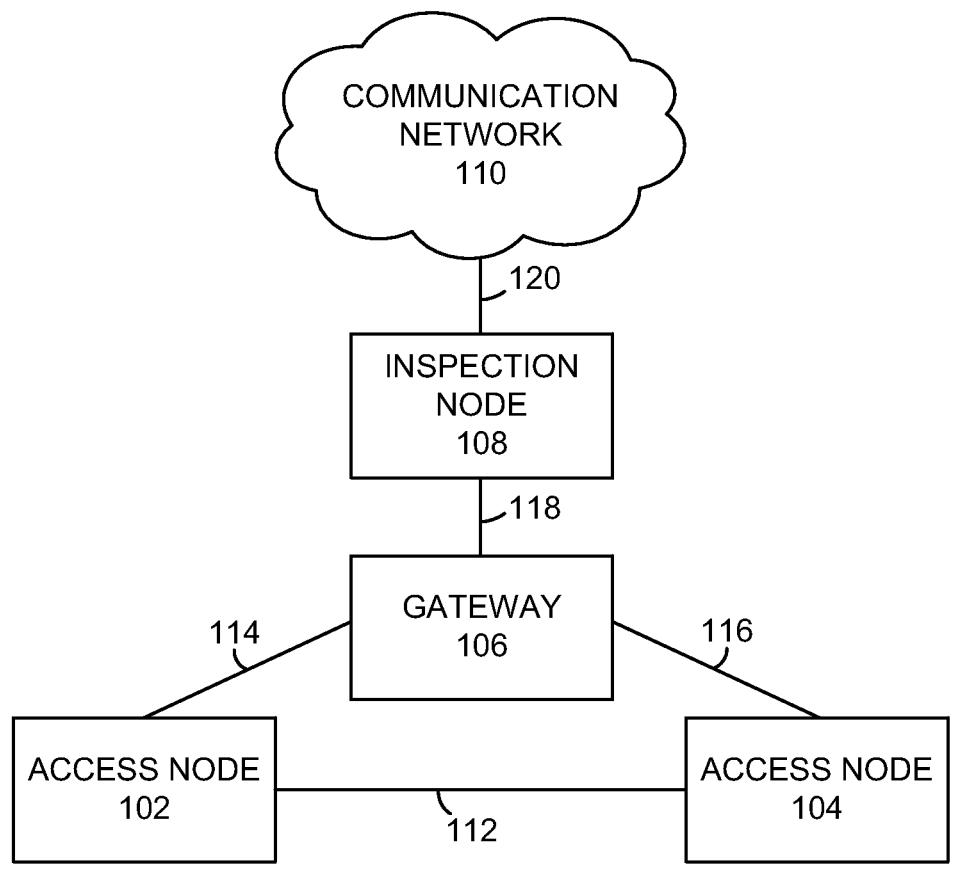
FIG. 1 illustrates an exemplary communication system to manage network communication.

FIG. 1 illustrates an exemplary communication system 100 to manage network communication comprising access nodes 102 and 104, gateway 106, inspection node 108, and communication network 110. Access nodes 102 and 104 each are a network node capable of providing wireless communications to a wireless device, and can be, for example, a base transceiver station, a radio base station, an eNodeB device, or an enhanced eNodeB device. Access node 102 is in communication with gateway 106 over communication link 114, and access node 104 is in communication with gateway 106 over communication link 116. Access nodes 102 and 104 can communicate with each other over communication link 112.

Gateway 106 is a network element in communication access nodes 102 and 104 and with inspection node 108. Gateway 106 can comprise a processor and associated circuitry to execute or direct the execution of computer-readable instructions to manage network communication. Gateway 106 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 106 can, among other things, receive a data flow from access node 102 or 104, and can also provide a data flow to access node 102 or 104, as well as to inspection node 108. Gateway 106 can receive instructions and other input at a user interface. Examples of gateway 106 can include a standalone computing device, a computer system, or a network component.

Inspection node 108 can communicate with gateway 106 over communication link 118 and with communication network 110 over communication link 120. Inspection node 108 is a network element which can comprise a processor and associated circuitry to execute or direct the execution of computer-readable instructions. Inspection node 108 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Inspection node 108 can, among other things, perform deep packet inspection of packets sent from gateway 106. Deep packet inspection generally involves an inspection of packets beyond Open Systems Interconnection (OSI) layer 3 and can include an inspection of the data portion of a packet (and possibly also the header of a packet). Inspection node 108 can be for example, a standalone computing device or network element, or the functionality of inspection node 108 can be included in another network element, such as a mobility management entity (MME), a gateway, a proxy node, or another network element.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 112, 114, 116, 118 and 120 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 102 and 104, gateway 106, inspection node 108, and communication network 110 which are omitted for clarity, including additional processing nodes, routers, gateways, and physical and/or wireless data links for carrying data among the various network elements.

Inspection node 108 can examine and measure data flows to and from gateway 106, but cannot measure other data flows of gateway 106, such as, for example, data flows between access node 102 and access node 104. However, such intra-access node traffic typically passes through gateway 106. In operation, a throughput of a data flow from access node 102 to gateway 106 is determined, and a throughput of a data flow from gateway 106 to inspection node 108 is also determined. Based on a difference between the throughput from access node 102 to gateway 106, and the throughput from gateway 106 to inspection node 108, a throughput between gateway 106 and access node 104 is determined comprising one or more data flows. The one or more data flows between gateway 106 and access node 104 can be identified and monitored, and when the throughput between gateway 106 and access node 104 meets a throughput threshold, and identified third data flow can be adjusted.

Figure 2:
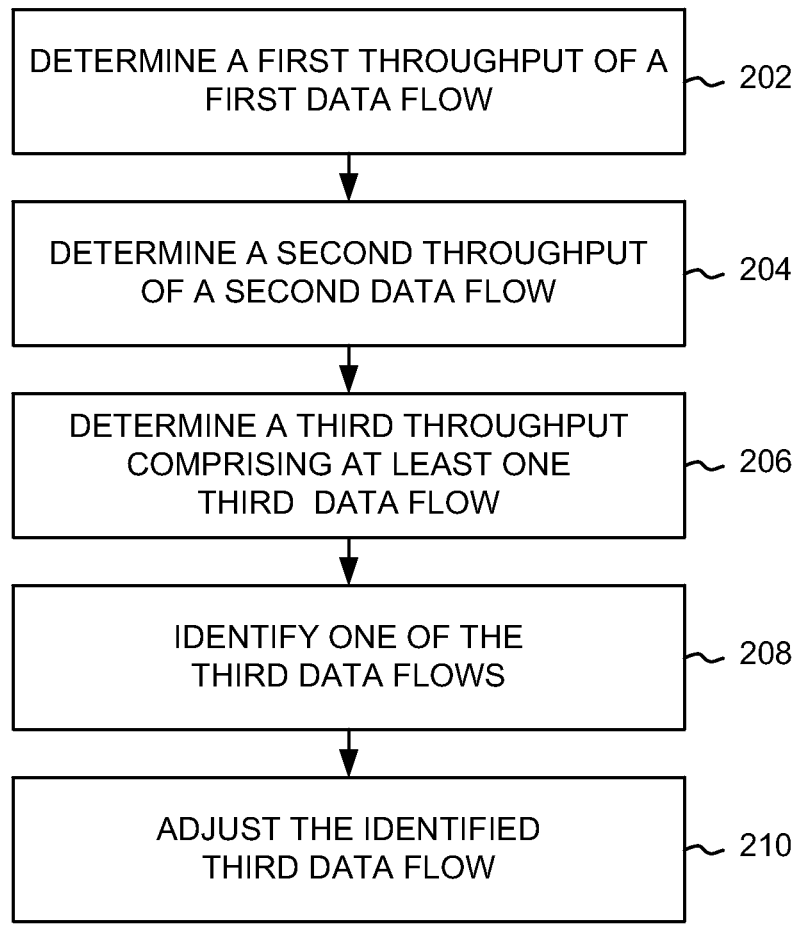
FIG. 2 illustrates an exemplary method of managing network communication.

FIG. 2 illustrates an exemplary method of managing network communication. In operation 202, a first throughput of a first data flow is determined. For example, a first data flow can be received at gateway 106 from access node 102, and a first throughput of the first data flow from access node 102 can be determined.

In operation 204, a second throughput of a second data flow is determined. For example, a second data flow can be received at inspection node 108 from gateway 106, and a second throughput of the second data flow from gateway 106 can be determined.

Based on a difference between the first throughput and the second throughput, a third throughput comprising one or more third data flows from the gateway to the second access node can be determined (operation 206). For example, a third throughput from gateway 106 to access node 104 can be determined. The third throughput can comprise one or more third data flows, where the throughput of each third data flow contributes to the third throughput. The third data flows can be, for example, data flows comprising information sent to a wireless device in communication with access node 104. In an embodiment, at least one of the third data flows can comprise information sent by a wireless device in communication with access node 102.

One of the third data flows of the third throughput is identified (operation 208), and when the third throughput meets a throughput threshold the identified third data flow is adjusted (operation 210). In an embodiment, the third data flow can comprise information sent by a wireless device in communication with access node 102 to a wireless device in communication with access node 104. An example of a type of data traffic sent from one wireless device to another wireless device is peer-to-peer communication. Communication network operators typically attempt to monitor traffic into, out of, and within a communication network. Also, network operators typically desire to detect and monitor applications which consume network resources. Applications which use large amounts of network resources are of particular concern to network operators. For example, come peer-to-peer applications exhibit "greedy" behavior, consuming a large portion of available network resources in order to send information from one peer to another. Network operators therefore desire to detect and monitor such network behavior, and where necessary to adjust the usage of network resources by such applications.

In an embodiment, access nodes 102 and 104 and gateway 106 can be considered to be network elements of a first communication network, and communication network 110 can be considered a second communication network. In an embodiment, the first throughput can be a measurement of traffic within a first communication network. In an embodiment, the second throughput can be a measurement of traffic which is being sent from a first communication network to a second communication network, for example from gateway 106 to communication network 110. In an embodiment, the third throughput can be a measurement of traffic within the first communication network, less the second throughput, i.e., traffic being sent from the first communication network to the second communication network.

Figure 3:
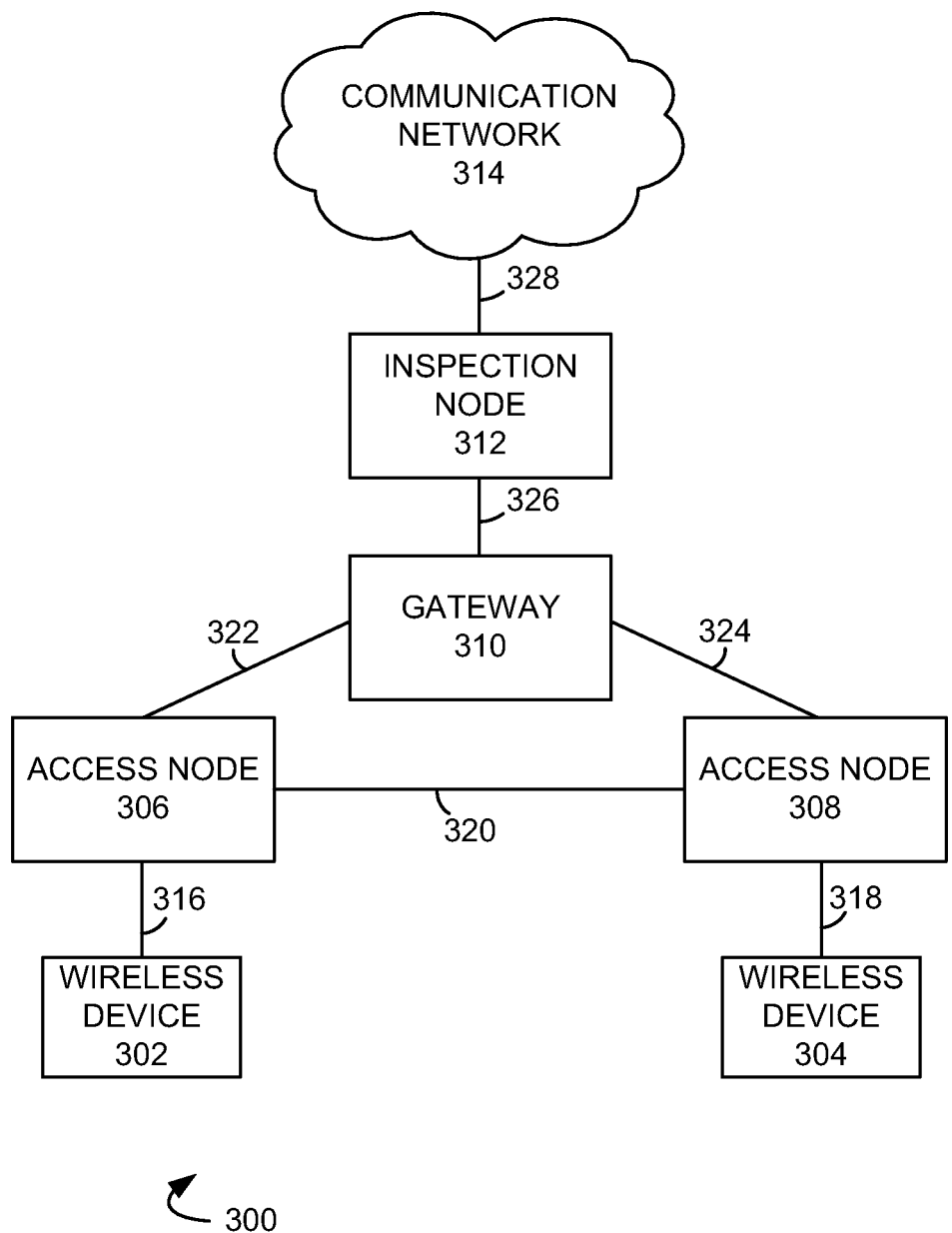
FIG. 3 illustrates another exemplary communication system to manage network communication.

FIG. 3 illustrates another exemplary communication system 300 to manage network communication comprising wireless devices 302 and 304, access nodes 306 and 308, gateway 310, inspection node 312, and communication network 314. Examples of wireless devices 302 and 304 can include a cell phone, a smart phone, a computing platform such as a laptop, palmtop, or tablet, a personal digital assistant, or an internet access device, including combinations thereof. Wireless device 302 is in communication with access node 306 over communication link 316, and wireless device 304 is in communication with access node 308 over communication link 318.

Each of access nodes 306 and 308 is a network node capable of providing wireless communications to a wireless device, and can be, for example, a base transceiver station, a radio base station, an eNodeB device, or an enhanced eNodeB device. Access node 306 is in communication with gateway 310 over communication link 322, and access node 308 is in communication with gateway 310 over communication link 324. Access nodes 306 and 308 can communicate with each other over communication link 320.

Gateway 310 is a network element in communication access nodes 306 and 308 and with inspection node 312. Gateway 310 can comprise a processor and associated circuitry to execute or direct the execution of computer-readable instructions. Gateway 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 310 can, among other things, receive a data flow from access node 306 or 308, and can also provide a data flow to access node 306, access node 308, or to inspection node 312. Gateway 310 can receive instructions and other input at a user interface. Examples of gateway 310 can include a standalone computing device, a computer system, or a network component.

Inspection node 312 can communicate with gateway 310 over communication link 326 and with communication network 314 over communication link 328. Inspection node 312 is a network element which can comprise a processor and associated circuitry to execute or direct the execution of computer-readable instructions. Inspection node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Inspection node 312 can, among other things, perform deep packet inspection of packets sent from gateway 310. Deep packet inspection generally involves an inspection of packets beyond Open Systems Interconnection (OSI) layer 3 including an inspection of the data portion of a packet (and possibly also the header of a packet). Inspection node 312 can be for example, a standalone computing device or network element, or the functionality of inspection node 312 can be included in another network element, such as a mobility management entity (MME), a gateway, a proxy node, or another network element.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 316, 318, 320, 322, 324, 326 and 328 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 306 and 308, gateway 310, inspection node 312, and communication network 314 which are omitted for clarity, including additional processing nodes, routers, gateways, and physical and/or wireless data links for carrying data among the various network elements.

Figure 4:
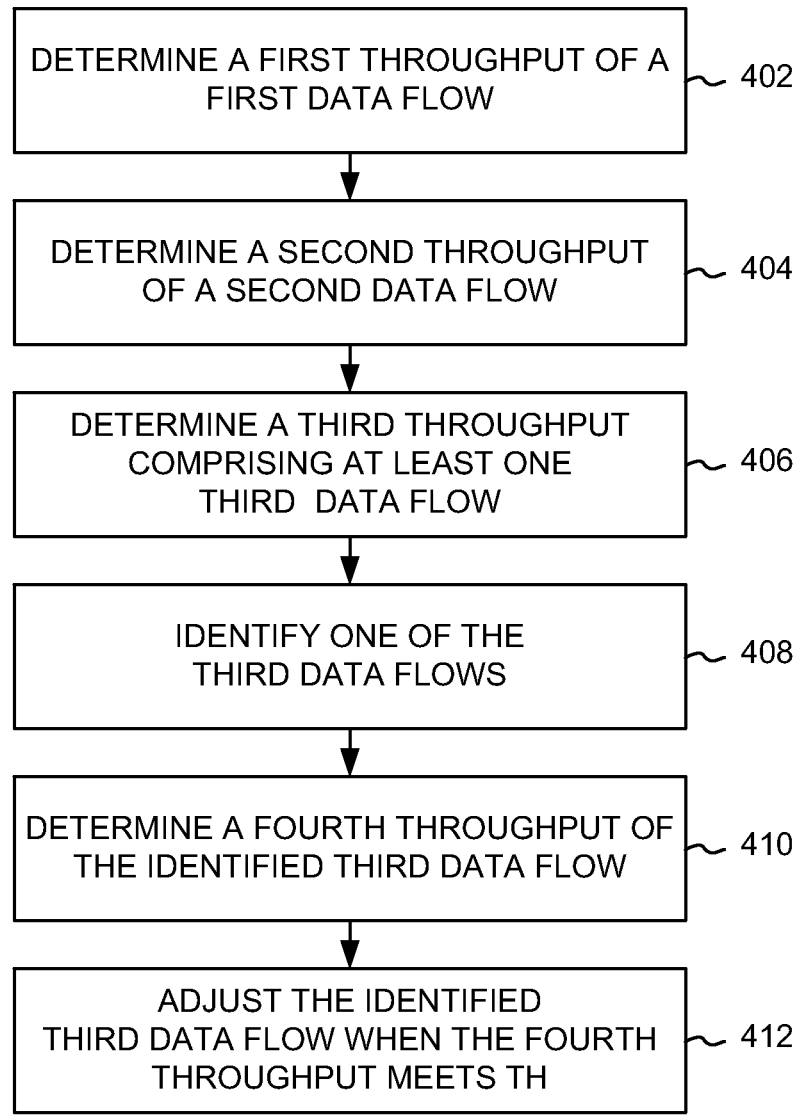
FIG. 4 illustrates another exemplary method of managing network communication.

FIG. 4 illustrates an exemplary method of managing network communication. In operation 402, a first throughput of a first data flow is determined. For example, a first data flow can be received at gateway 310 from access node 306, and a first throughput of the first data flow from access node 306 can be determined.

In an embodiment, the first throughput and the second throughput can be associated with at least one of an uplink portion and/or a downlink portion of a wireless communication link, such as communication link 316 and/or communication link 318. In an embodiment, the first throughput can be associated with an uplink portion and/or a downlink portion of communication link 316. In an embodiment, the third throughput can be associated with an uplink portion and/or a downlink portion of communication link 318.

The determination of a throughput can be based on one or more factors. For example, in an embodiment, the second throughput can be determined based on at least one of a modulation and coding scheme assigned to the second data flow, an uplink throughput, a downlink throughput, a congestion criteria, a communication link load, and a number of wireless devices using a communication link.

In operation 404, a second throughput of a second data flow is determined. For example, a second data flow can be received at inspection node 312 from gateway 310, and a second throughput of the second data flow from gateway 310 can be determined.

Based on a difference between the first throughput and the second throughput, a third throughput comprising one or more third data flows from the gateway to the second access node can be determined (operation 406). For example, a third throughput from gateway 310 to access node 308 can be determined. The third throughput can comprise one or more third data flows, where the throughput of each third data flow contributes to the third throughput. A third data flow can comprise, for example, information sent to wireless device 304 in communication with access node 308. In an embodiment, a third data flow can comprise, for example, information sent to wireless device 304 from wireless device 302. One example of a third data flow can be a peer-to-peer data flow.

One or more third data flows of the third throughput are identified (operation 408), and a fourth throughput of the identified third data flow is determined (operation 410). For example, the third throughput can comprise a plurality of data flows, and each of the plurality of data flows can each comprise a fourth throughput, such that the third throughput comprises a plurality of fourth throughputs. In an embodiment, the third data flows can be examined at a greater level of detail to identify a contribution of each third data flow to the third throughput.

A third data flow can be identified based on, for example, network location information of its source and its destination, such as an internet protocol (IP) address associated with the source and/or destination, or a port associated with the source and/or destination. In an embodiment, at least one of the third data flows can be identified based on additional information, for example, based on a network source location, a network destination location, and the difference of the first throughput and the second throughput. In an embodiment, at least one of the third data flows can be identified based on a network source location, a network destination location, the difference of the first throughput and the second throughput, and whether a resource utilization meets a utilization threshold.

The resource utilization can be, for example, a utilization of network resources at an access node. For example, the resource utilization can be based on at least one of a modulation and coding scheme (MCS), and IP address or port associated with the data flow, the fourth throughput of the identified third data flow, a consumption of radio frequency resources of a communication link by the third data flow (i.e., an RF load), and a total number of devices using the network resources. The access node can be, for example, an access node serving a wireless device to which information is being sent (for example, access node 308 and wireless device 304). In an embodiment, the utilization can also be determined at a sub-unit of an access node, such as a sector, and the resource utilization is a utilization of resources at a sector served by a destination access node.

In operation 412, when the fourth throughput meets a throughput threshold the identified third data flow is adjusted. In an embodiment, the throughputs of each of the identified third data flows (i.e., the fourth throughputs) can be monitored, and it can be determined when one of the fourth throughputs meets a threshold. The threshold can comprise, for example, a data rate. A data rate can also be considered together with a type of data traffic and/or an application type to form a threshold. A threshold can also comprise an amount of data, either absolute or over a period of time. A priority level of the data traffic can also be considered. Combinations of the foregoing are also possible. For example, data traffic associated with a delay-sensitive application, such as voice data (e.g., from a VoIP application or other similar application) can be associated with a first data rate threshold, and data traffic associated win a non-delay-sensitive application can be associated with a second data rate threshold lower than the first data rate threshold.

When the fourth throughput meets the threshold, the data flow can be adjusted. For example, the data rate of the identified third data flow can be reduced. The third data flow can also be limited to a total amount of data, such as a data cap or maximum amount of data. Further, the third data flow can be limited to a data rate threshold, for example, in the case of a third data flow which is bursty, jittery, or intermittent. As another example, the third data flow can be limited to a period of time, beyond which the third data flow is reduced or stopped. In an embodiment, the third data flow is adjusted to bring a total amount of traffic between access nodes 306 and 308 down to a traffic threshold while maintaining a communication session with wireless device 304. For example, the third data flow can be adjusted to reduce the total amount of traffic between access nodes 306 and 308 down to a traffic threshold while avoiding a disconnection of a communication session with wireless device 304.

Figure 5:
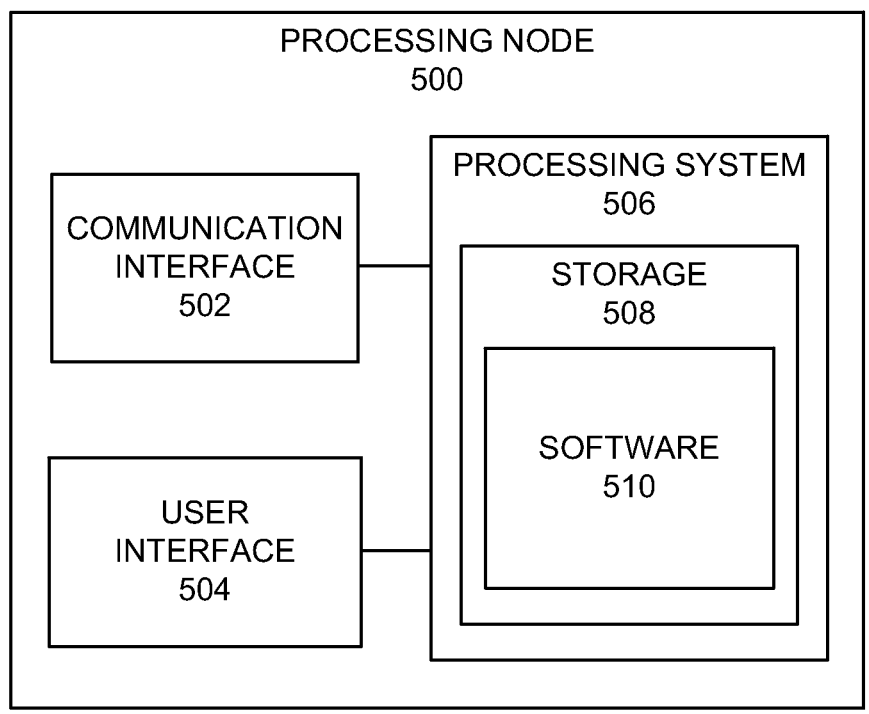
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 is capable of managing network communication. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500. Examples of processing node 500 include gateway 310 and inspection node 312. Processing node can also be an adjunct or component of a network element, such as an element of gateway 310 and inspection node 312. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing intra-access node traffic, the method comprising:
    receiving a first data flow at a gateway node from a first access node and, based on the received first data flow, determining an associated first throughput;
    inspecting a second data flow received from the gateway node at an inspection node and, based on the inspection, determining a second throughput associated with the second data flow;
    identifying, at the gateway node, one or more peer-to-peer data flows sent from the gateway node to at least a second access node, wherein each of the one or more peer-to-peer data flows is identified based on:
        a calculated difference of the first throughput and the second throughput; and,
        a calculated resource utilization that is based at least on a modulation and coding scheme (MCS) assigned to the one or more of the peer-to-peer data flows;
    determining that a third throughput associated with each of the one or more peer-to-peer data flows meets a threshold; and,
    adjusting at least one of the one or more peer-to-peer data flows exceeding a predefined usage threshold to meet a total traffic threshold.

2. The method of claim 1, wherein the first throughput and the second throughput are associated with at least one of an uplink portion of a communication link and a downlink portion of the communication link.

3. The method of claim 1, wherein the second throughput is determined based on at least one of a modulation and coding scheme (MCS) assigned to the second data flow, an uplink throughput, a downlink throughput, a congestion criteria, a communication link load, and a number of wireless devices using a communication link.

4. The method of claim 1, further comprising:
identifying one of the one or more peer-to-peer data flows based on a network source location, a network destination location, and the difference of the first throughput and the second throughput.

5. The method of claim 1, further comprising:
identifying one of the one or more peer-to-peer data flows based on a network source location and a network destination location.

6. The method of claim 1, wherein the resource utilization associated with each of the one or more peer-to-peer data flows is a determined utilization of resources at a sector served by a destination access code.

7. The method of claim 1, wherein adjusting the one or more peer-to-peer data flows further comprises at least one of adjusting a data rate of the one or more of the peer-to-peer identified third data flows, limiting a total amount of data, limiting a data rate to a data rate threshold, and limiting the third data flow to a time period.

8. A system for managing intra-access node traffic, the system comprising:
a processing node configured to:
determine a first throughput associated with a first data flow received at a gateway node from a first access node;
inspect a second data flow received at an inspection node from the gateway node and, based on the inspection, determine a second throughput associated with the second data flow;
identify one or more peer-to-peer data flows sent from the gateway node to at least a second access node, wherein each of the one or more peer-to-peer data flows is identified based on:
a calculated difference between the first throughput and the second throughput; and,
a calculated resource utilization that is determined based at least on a modulation and coding scheme (MCS) assigned to one or more of the peer-to-peer data flows;
determine a third throughput associated with each of the one or more peer-to-peer data flows; and,
adjust at least one of the one or more peer-to-peer data flows exceeding a predefined usage threshold to meet a total traffic threshold.

9. The system of claim 8, wherein the first throughput and the second throughput are associated with at least one of an uplink portion of a communication link and a downlink portion of the communication link.

10. The system of claim 8, wherein the second throughput is determined based on at least one of a modulation and coding scheme (MCS) assigned to the second data flow, an uplink throughput, a downlink throughput, a congestion criteria, a communication link load, and a number of wireless devices using a communication link.

11. The system of claim 8, wherein the processing node is further configured to:
identify one of the one or more peer-to-peer data flows based on a network source location and a network destination location.

12. The method of claim 8, wherein the resource utilization is a utilization of resources at a sector served by a destination access node.

13. The system of claim 8, wherein the processing node is further configured to adjust the at least one of the one or more peer-to-peer data flows by at least one of adjusting a data rate of the at least one peer-to-peer data flow, limiting a total amount of data, limiting a data rate to a data rate threshold, and limiting the at least one peer-to-peer data flow to a time period.

* * * * *